United States Patent [19]

Woods

[11] 4,221,101
[45] Sep. 9, 1980

[54] APPARATUS FOR EVACUATING AND SEALING BAGS

[75] Inventor: Quentin T. Woods, San Jose, Calif.

[73] Assignee: FMC Corporation, San Jose, Calif.

[21] Appl. No.: 11,453

[22] Filed: Feb. 12, 1979

[51] Int. Cl.³ .............................................. B65B 31/06
[52] U.S. Cl. .......................................... 53/79; 53/512
[58] Field of Search .................................. 53/512, 79

[56] References Cited

U.S. PATENT DOCUMENTS

| | | | |
|---|---|---|---|
| 2,559,368 | 7/1951 | Pancratz . | |
| 2,672,268 | 3/1954 | Bower . | |
| 2,749,686 | 6/1956 | Lorenz et al. | 53/512 X |
| 2,800,756 | 7/1957 | Schild | 53/512 X |
| 2,840,964 | 7/1958 | Kissling | 53/512 X |
| 2,963,838 | 12/1960 | Harrison et al. | 53/512 X |
| 3,289,387 | 12/1966 | Stagmeier et al. | 53/512 |

FOREIGN PATENT DOCUMENTS 2008981 9/1971 Fed. Rep. of Germany ............. 53/512

*Primary Examiner*—Travis S. McGehee
*Attorney, Agent, or Firm*—R. S. Kelly; T. J. McNaughton

[57] ABSTRACT

An apparatus for heat-sealing the mouth of a bag supported on a conveyor includes a nozzle assembly for both spreading the mouth of the bag and evacuating the bag and a press assembly having confronting die units and resilient strip assemblies mounted to scissorable arms. The vacuum-sealing apparatus is positioned adjacent the side margin of the conveyor, and the bag having an article therein is horizontally supported on the conveyor with the mouth of the bag extending toward the heat-sealing apparatus over said side margin of the conveyor. The nozzle assembly includes a pair of parallel nozzle members of generally flat shape which are mounted to a drive mechanism such that the nozzle members may first be concurrently driven into the mouth of the bag and thereafter separated in a horizontal plane against the side margins of the bag mouth to an extent such that substantially all wrinkles are removed from the area of the bag to be sealed. While the nozzle members are separated to flatten the mouth of the bag, the press assembly arms are scissored together to compress the resilient strip assemblies against the flattened mouth portion of the bag and the enclosed nozzle members to form an air-tight seal thereat. The bag is then evacuated and/or gas-purged by means of passageways formed through the nozzle members. The nozzle members are thereafter removed while the resilient strips help maintain an air-tight seal and retain the mouth area to be sealed in a wrinkle-free condition. The bag is then sealed by the die units by forcing the press assembly arms further together.

4 Claims, 9 Drawing Figures

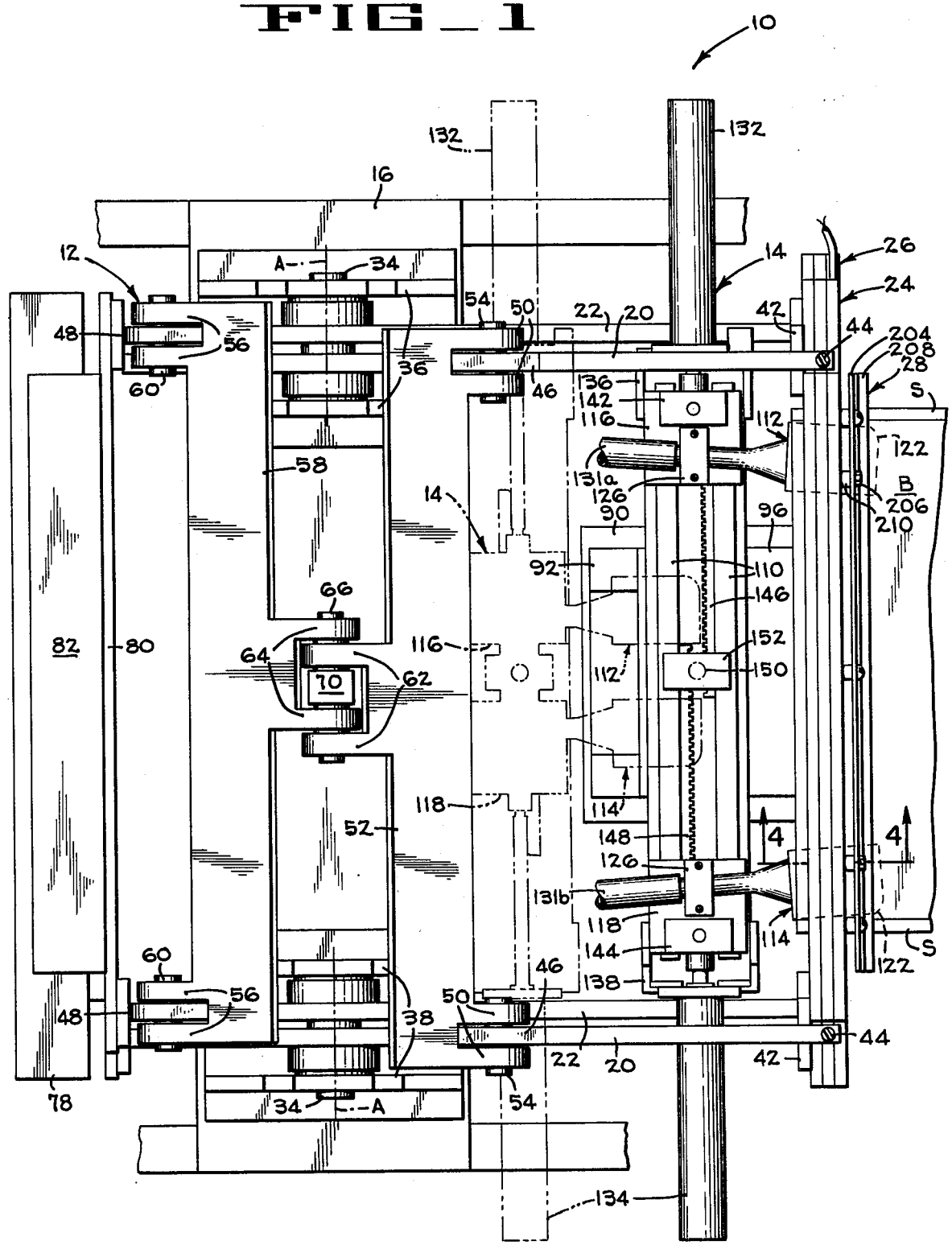

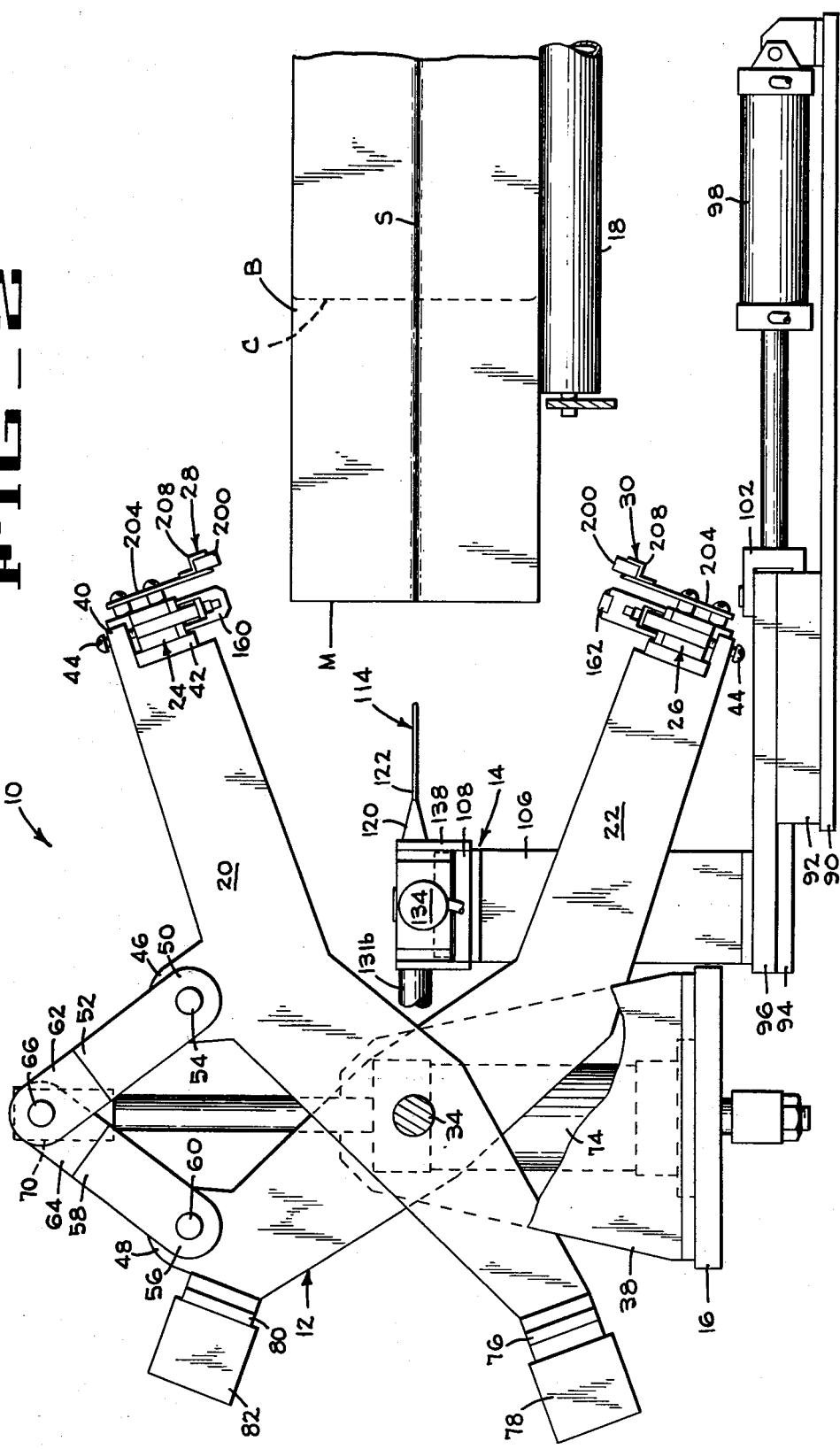
FIG_2

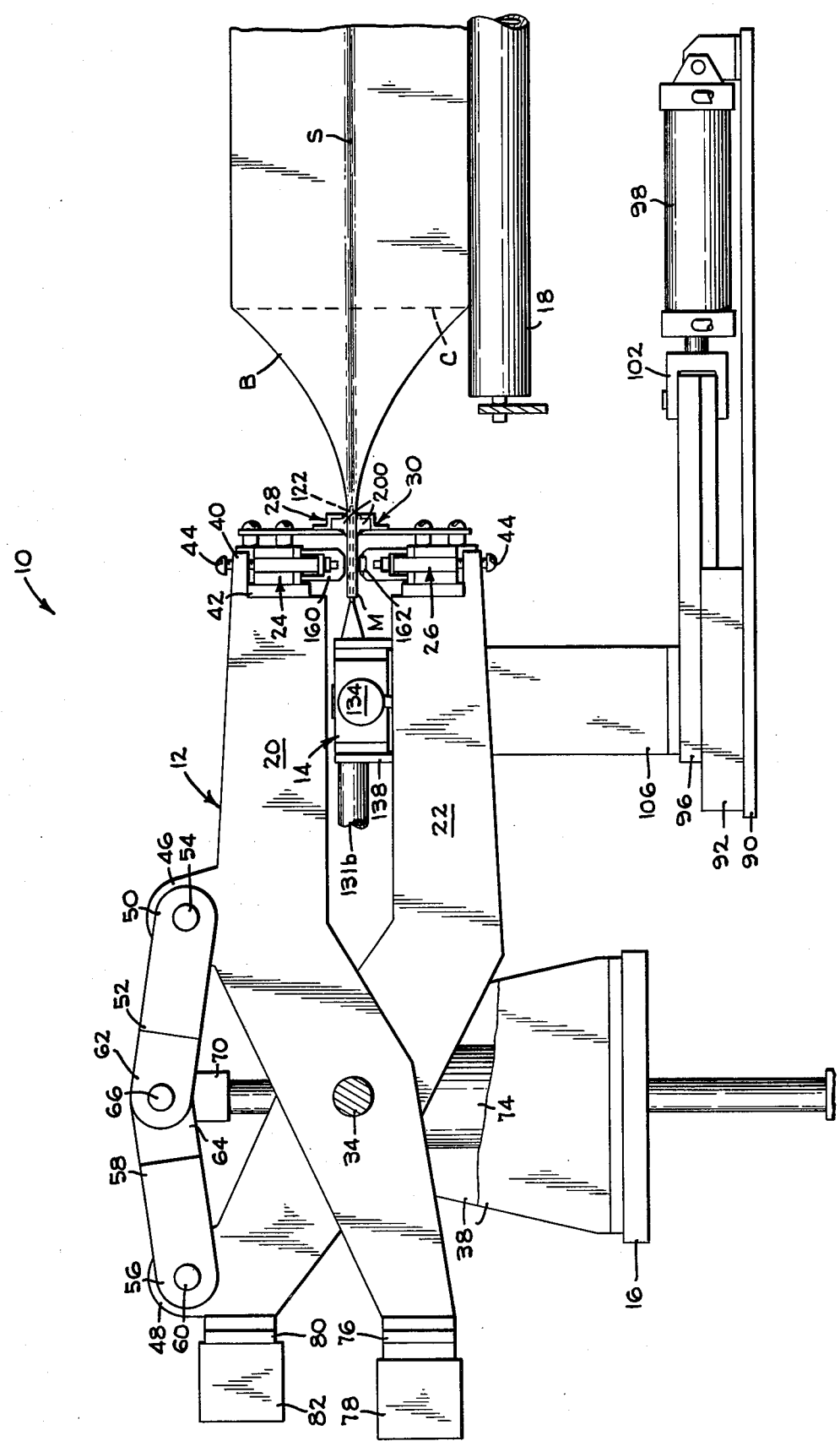

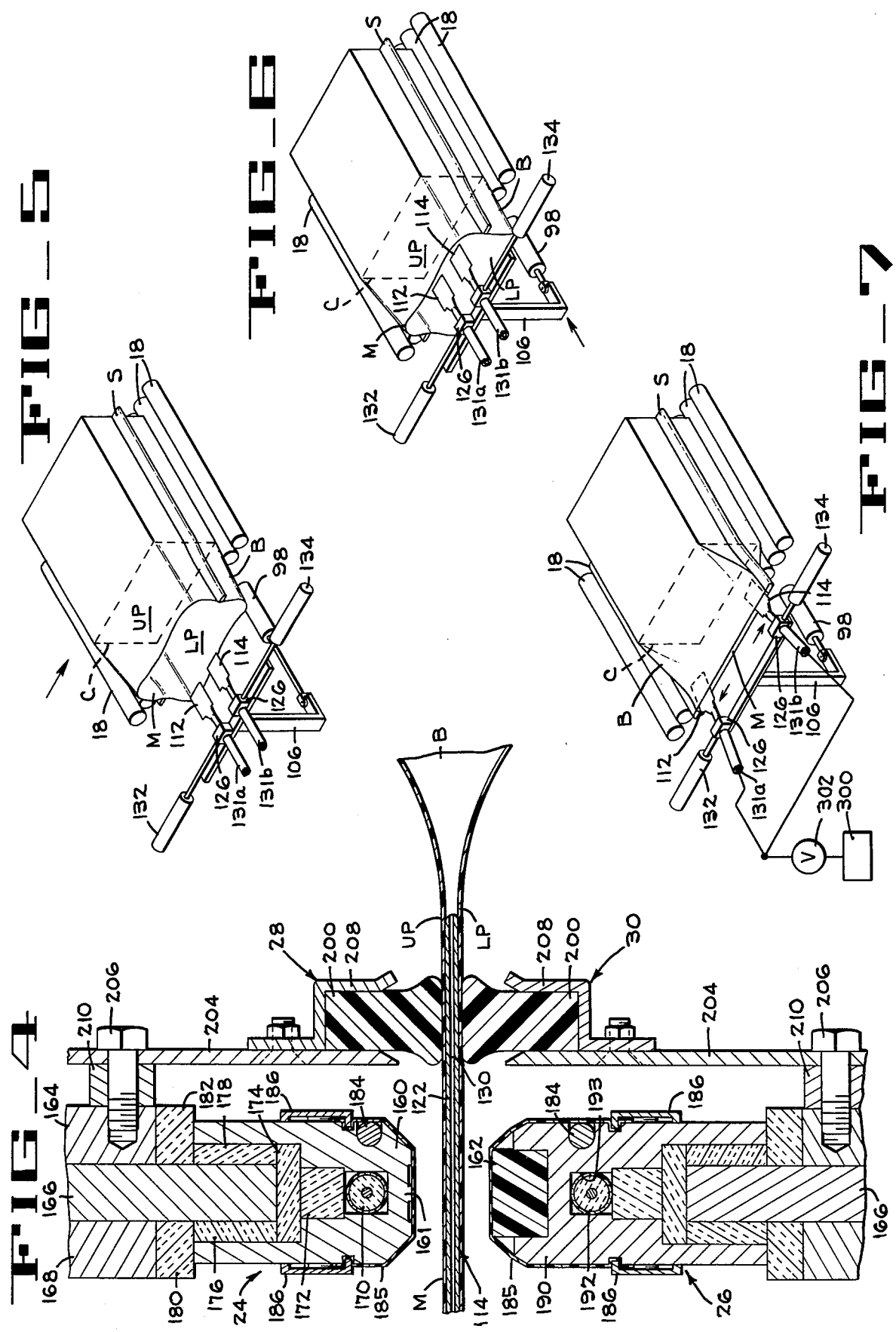

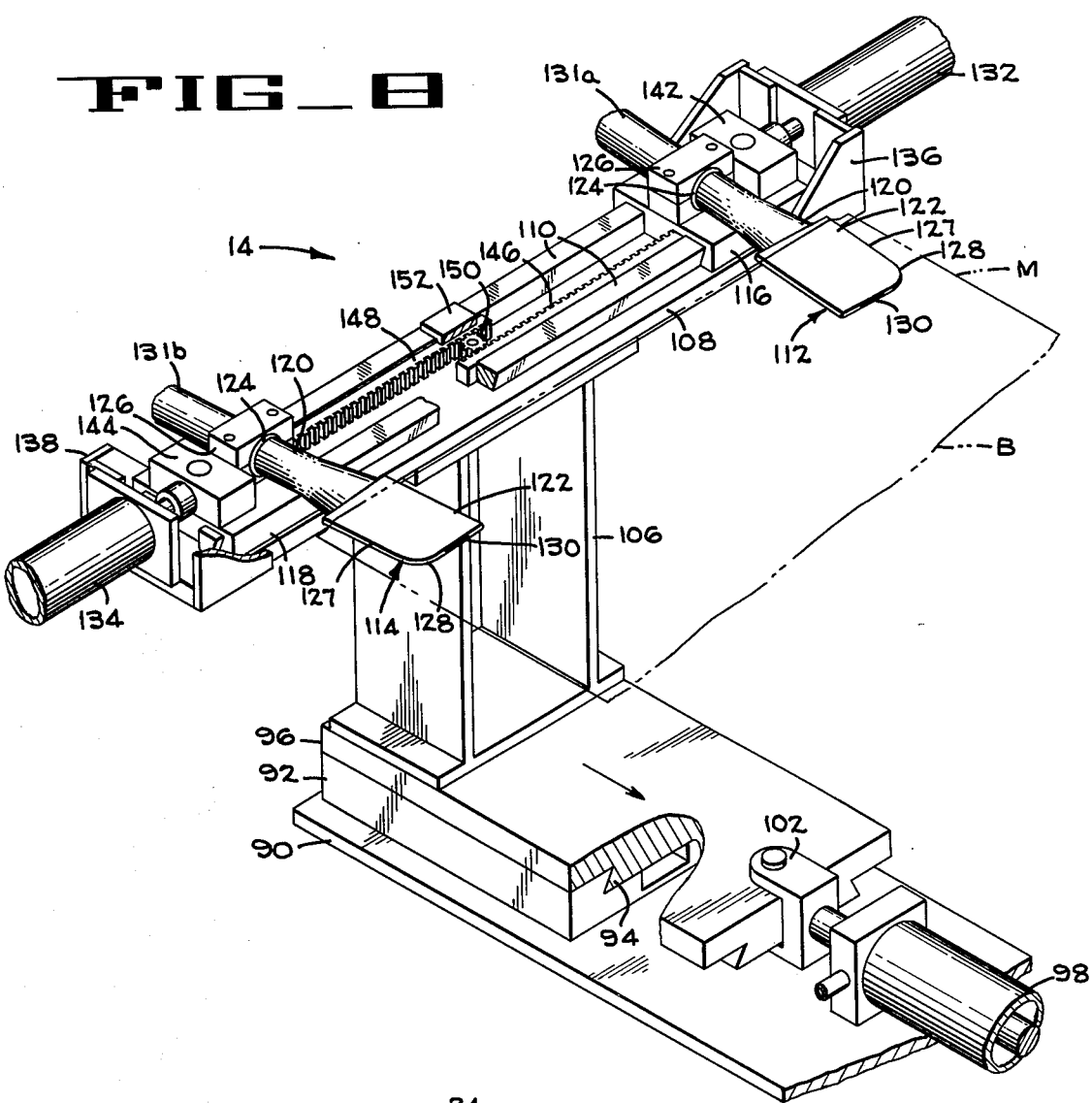
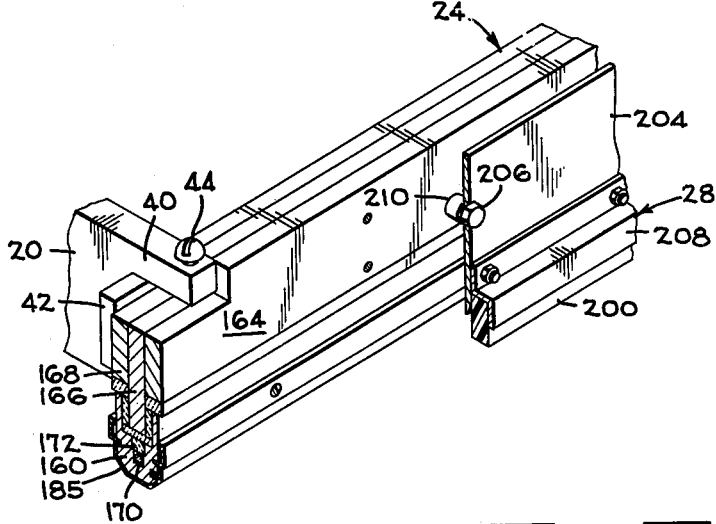

APPARATUS FOR EVACUATING AND SEALING BAGS

BACKGROUND OF THE INVENTION

1. Field of the Invention

The present invention generally relates to an apparatus for evacuating and/or gas-purging a flexible bag and thereafter sealing the bag. More particularly, the present invention concerns apparatus for evacuating and/or gas-purging a bag and sealing the mouth of the bag while the exterior of the bag is exposed to ambient atmospheric conditions.

2. Description of the Prior Art

Products are often packaged in flexible bags made of gas-tight flexible thermoplastic material which is seamed in a gas-tight manner and which has a mouth that is hermetically sealable. Usually, the panels forming the mouth have at least inner surfaces formed of a heat-sealable material so that a target area across the bag mouth may be heated by die units to form a hermetical seal thereat. A wide variety of laminated web material is now available for making flexible bags, with a popular construction for vacuum-packaging being aluminum foil having a layer of polyethylene plastic on the inside surface of the foil.

An apparatus for vacuum-sealing thermoplastic pouches is illustrated in U.S. Pat. No. 2,672,268 to Bower, wherein a vacuum nozzle is inserted along a horizontal plane into the mouth of a bag and a pair of confronting resilient strips are thereafter forced toward each other above and below the nozzle to force the panels forming the bag mouth against the nozzle. While the bag is in this condition, vacuum is applied through the nozzle to collapse the bag. With the bag so collapsed and the nozzle remaining inserted, the bag mouth is sealed by die units which are operated separately from the resilient strips and which are pressed against the bag at an area between the open end where the nozzle is inserted and the closed opposite end of the bag.

U.S. Pat. No. 2,559,368 to Pancratz discloses a vacuum-sealing apparatus which includes a nozzle for applying a vacuum to a bag; a pair of opposing, conjointly operable, resilient strips, and an elongate sealing die member which is forced against a resilient anvil to seal the mouth of the bag below the nozzle. In the operation of this apparatus, a bag is vertically supported in a forming assembly, and the nozzle is driven downwardly into the bag. Then, one of the resilient strips is forced horizontally toward the other thereof such that they compress the bag panels against the side surfaces of the nozzle, the nozzle being narrower than the mouth of the bag so that the strips compress the panels against each other at the side of the nozzle. The Pancratz patent further discloses a pair of fingers which are inserted into the bag mouth with the nozzle and which are forced away from each other against the side margins of the mouth to thus flatten the mouth of the bag prior to evacuation. The arms along with the vacuum nozzle are removed after evacuation to permit a second seal to be formed nearer the outer end of the mouth.

SUMMARY OF THE INVENTION

According to the present invention, an apparatus for sealing the mouth of a thermoplastic bag includes a pair of nozzle members which are first used to draw the mouth of the bag into a flat, wrinkle-free condition and which are used thereafter to apply a vacuum and/or a purging gas to the bag. The nozzle members are mounted in a parallel relationship for movement generally in a plane which is parallel to the top and bottom panels of a bag when the bag is supported in a position to be sealed. The nozzle members are first moved into the mouth of the bag to be sealed and are then separated in a synchronous manner until the nozzle members engage the opposing margins of the bag with a force sufficient to flatten the mouth of the bag. The nozzle members are preferably resiliently mounted so that they both tilt inwardly when forced against the adjacent margins. This inward tilting assures that the side seams of the bag will not be damaged by the nozzle members. Also, the tilting provides a negative draft effect enabling the nozzle members to be readily removed from the bag while the bag mouth remains under tension.

In a preferred embodiment of the invention, the apparatus further includes a confronting pair of resilient strips rigidly mounted to the opposing die units of a heating-sealing press assembly. The resilient strips coact to form an air tight seal between the panels of the bag and also between the panels and the nozzle members prior to the application of a partial vacuum or a purging gas to the bag through the nozzle members. When a purging gas is provided, the strips serve to provide an air-tight seal across the mouth. When vacuum is applied, the strips help prevent any wrinkles induced by the application of the vacuum from spreading into the heat-seal target area—which is situated between the area engaged by the strips and the open end of the bag. The strips are sufficiently deformable to permit the rigidly interconnected die units to be forced into a heat-sealing mode against the bag after the bag has been evacuated and/or purged.

It will be appreciated that the sealing apparatus of the present invention will provide for both rapid evacuation and/or gas-purging and wrinkle-free, high integrity, heat-sealing of bags with fewer elements than incorporated in prior known sealing apparatus. Moreover, the apparatus is adaptable to evacuating or purging and sealing bags of varying widths by simply adjusting the distance of lateral travel of the nozzles.

BRIEF DESCRIPTION OF THE DRAWINGS

FIG. 1 is a top plan view of a preferred embodiment of the sealing apparatus of the present invention with portions thereof being broken away and with the retracted position of the nozzle assembly being shown in phantom lines.

FIG. 2 is a side elevational view of the sealing apparatus shown in FIG. 1 with the nozzle assembly being shown in retracted condition and the press assembly in its open condition.

FIG. 3 is a side elevational view of the sealing apparatus of the present invention similar to FIG. 2 but depicting the upper and lower arms of the press assembly in their closed position and the nozzle assembly in its operative position within the bag.

FIG. 4 is an enlarged section taken on line 4—4 of FIG. 1.

FIGS. 5-7 are diagrammatic isometric views which illustrate the operating sequence of the nozzle assembly.

FIG. 8 is an enlarged isometric view of the nozzle assembly of the sealing apparatus of the present invention.

FIG. 9 is an enlarged, fragmentary, isometric view of an end portion of the upper die unit of the sealing apparatus of the present invention.

DESCRIPTION OF A PREFERRED EMBODIMENT

Referring now more particularly to FIGS. 1 and 2, a bag sealing apparatus 10 will be seen to include a press assembly 12 and a nozzle assembly 14, the press assembly being mounted to a support plate 16 adjacent a side margin of the rollers 18 (FIG. 2) of a roller conveyor (shown in part). A bag B (FIG. 2) having a rectangular carton C enclosed therein is supported on the conveyor rollers 18 such that the mouth M of the bag, which is formed by the upper and lower panels UP and LP respectively (FIG. 5) and which is sealed by seams S at its side margins, extends over said side margin of the conveyor rollers, as shown in FIG. 2.

The press assembly 12 includes a pair of parallel upper arms 20 and a pair of parallel lower arms 22. Upper and lower die units 24 and 26, respectively, are mounted to the inner ends of the upper and lower pairs of arms 20 and 22, respectively, such that the die units confront each other so as to abut each other when the arms are scissored together. A pair of resilient strip assemblies 28 and 30 are rigidly mounted to the die units 24 and 26, respectively, in parallel spaced relationship. As best shown in FIG. 3, the press assembly 12 is positioned relative to the conveyor rollers 18 such that when the press assembly 12 is activated, the die units and the resilient strip assemblies will bear against the bag mouth along paths parallel to and closely spaced from the adjacent side margin of the rollers 18.

The upper and lower pairs of arms 20 and 22 of the press assembly 12 are pivotally connected by a pair of pins 34 which are received within bearings which, in turn, are respectively supported by two pairs of trunnion plates 36 and 38 which are welded to the support plate 16 (FIGS. 1 and 2). The upper and lower arms are thus scissorable about an axis A—A (FIG. 1) extending through the pins 34. As previously indicated, the upper and lower die units 24 and 26 are mounted in confronting relationship to the distal ends of the arms of the press assembly 12. As depicted in FIGS. 2 and 9, the distal end of each upper arm and lower arm is cut away to form a projection 40 to mount the die unit. Each die unit is adjustably bolted in slots (not shown) in a pair of brace bars 42 which are welded to the ends of the respective upper or lower pair of arms. Adjusting bolts 44 are threaded through the projections 40 to abut against the top of the upper die unit and the bottom of the lower die unit. By adjusting the position of the bolts 44, the upper and lower die units can be adjustably positioned for proper abutment when the arms 20 and 22 are moved together.

As illustrated in FIGS. 1 and 2, each upper arm 20 has an ear 46 extending upwardly therefrom at a position between the axis of rotation A—A of the arm and the projecting inner end thereof to which the upper die unit 24 is mounted. Each of the lower arms 22 has a similar ear 48 extending upwardly from the outermost end thereof. The upper arm ears 46 are received within pairs of clevis-type brackets 50 which extend downwardly from the ends (FIG. 1) of an inner draw bar 52 with the ears 46 and the brackets 50 being pivotally connected by a pair of pins 54. The ears 48 formed at the outer ends of the lower arms are received within a pair of clevis-type brackets 56 which depend from the ends of an outer draw bar 58, with such brackets 56 being pivotally connected to the ears 48 by a pair of pins 60. The inner and outer draw bars 52 and 58 have brackets 62 and 64, respectively, extending in closely spaced opposed relationship near the centers of the draw bars so that they all can be rotatably received upon a transversely extending shaft 66. Suitable flanged bearings are provided for mounting the draw bars on the shaft 66 through brackets 62 and 64. A knuckle 70 connected to the outer end of the piston of a hydraulic cylinder 74 is received on the shaft 66 at the center thereof. The hydraulic cylinder 74 is vertically mounted to the support plate 16.

As will be seen from FIGS. 1 and 2, a brace bar 76 is secured between the outer ends of the pair of arms 20, and a counterweight block 78 is attached to the brace bar 76. Similarly, as seen in FIGS. 1 and 2, a brace bar 80 is secured to the outer ends of the arms 22, and a lighter counterweight block 82 is secured to the bar 80.

As depicted in FIG. 2, when the piston is extended from the hydraulic cylinder 74, the upper and lower arms of the press assembly 12 are placed in an opened condition permitting a bag B to be moved by the conveyor rollers 18 to a position aligned with the press assembly. As illustrated in FIG. 3 and as will be discussed hereinafter, by retracting the piston into the cylinder 74, the arms 20 and 22 are scissored into a first closed position suitable for evacuation and/or gas-purging of the bag. The arms can thereafter be further moved toward each other to a second closed position suitable for heat-sealing of the mouth of the bag (such position not being shown in the drawings).

Referring next to FIGS. 1, 2 and 8, it will be seen that the nozzle assembly 14 is separately mounted from the press assembly 12 upon a base plate 90. As best seen in FIG. 8, a track guide block 92 is secured to the base plate 90. A track 94 formed on the bottom of a slide plate 96 is slidably received in the complementary track recess of the guide block 92 (FIGS. 2 and 8). The track guide block is oriented such that the slide plate is directed to move along a horizontal path which is perpendicular to the direction of travel of the adjacent conveyor defined by the conveyor rollers 18. The slide plate is driven by a hydraulic cylinder 98, and the piston of the cylinder 98 is connected by coupling 102 to the center of the inner end of the slide plate adjacent the conveyor rollers 18. A pedestal structure 106 is affixed to the outer end of the slide plate 96, and an elongate rectangular plate 108 is fastened to the upper end of the pedestal structure to extend transversely to the direction of movement of the slide plate. A pair of parallel guide tracks 110 are affixed to the upper surface of the plate 108 to extend the length of the plate 108, that is, in a direction perpendicular to that of the track 94.

The nozzle assembly 14 includes a pair of nozzle, or snorkel, members 112 and 114 which are resiliently mounted in a parallel relationship to a pair of saddle blocks 116 and 118, respectively, which are slidably received on the guide tracks 110, with the nozzle members extending generally parallel to the underlying guide track 94 and thus perpendicularly to the side margin of the conveyor rollers 18. The nozzle members each include a generally cylindrical tubular portion 120 and a flattened head portion 122 affixed to an outwardly tapered end of the tubular portion 120. The tubular portions of the nozzle members 112 and 114 have hoses 131a and 131b, respectively, connected thereto. As shown diagrammatically in FIG. 7, such hoses preferably communicate with a vacuum source 300, with a valve 302 being provided to control the application of vacuum to the hoses. A resilient gasket 124 (FIG. 8) is mounted on the tubular portion 120 of each nozzle member in spaced relationship to the head portion 122, and each gasket 124 is received within a Jergens clamp 126 that is secured to the respective saddle block 116, 118. As shown in FIGS. 1, 7 and 8, the resilient mounting of the nozzle members permits the nozzle members to tilt inwardly toward each other when the head portions 122 are forced against the seams, or side margins, S of the mouth M of the bag.

The head portions 122 of the nozzle members 112, 114 are flat and thin, and a narrow passageway 130 (FIGS. 4 and 8) is longitudinally formed through each head portion. The outwardly facing edge 127 (FIG. 8) of each head portion, which is adjacent the seam S of the bag when the nozzles are inserted within the mouth of the bag, is rounded at the top and bottom surfaces thereof, and the inner corner 128 of such edge is rounded toward the leading edge 130 of the head portion. The head portions are formed from aluminum and are coated with a low-friction elastomeric material, such as a polytetrafluoroethylene polymer, to facilitate withdrawal of the head portions from the bag while they are still extended outwardly against the seams S of the bag and also while the resilient strip assemblies 28 and 30 (to be described in greater detail hereinafter) are engaged against the flat upper and lower surfaces of the head portions through the interposed bag.

The saddle blocks 116 and 118 supporting the nozzle members 112 and 114 are driven toward and away from each other along the tracks 110 by a pair of hydraulic cylinders 132 and 134, respectively, as best seen in FIG. 8. The cylinders 132 and 134 are respectively attached to brackets 136 and 138 at the opposed ends of the support plate 108. The pistons of the cylinders 132 and 134 are mounted by trunnion blocks 142 and 144, respectively, to the saddle blocks 116 and 118. The saddle block 116 has a rack 146 affixed thereto to slide against the inner surface of one of the guide tracks 110. The other saddle block 118 has a similar rack 148 extending therefrom which slides against the inner surface of the other of the guide tracks 110. A gear 150 is freely rotatably mounted so that it rotates about a vertical axis at the center of the support plate 108 between a gear mounting plate 152 and the surface of plate 108. The gear 150 is located at a position between the parallel racks 146 and 148 so as to engage the teeth on both of the racks. The racks 146, 148 and the gear 150 cooperate to assure that when the cylinders 132 and 134 are actuated to cause the nozzle members to grip the inner edges of the bag B, the nozzle members will laterally separate from each other in a uniform and synchronous manner.

Before describing the construction of the die units 24 and 26 and the resilient strip assemblies 28 and 30, a brief description of the operation of the nozzle assembly 14 will be provided. The bag B having a rectangular carton C inserted therein (FIG. 2) is placed on the upstream end of the conveyor rollers 18 such that the mouth M of the bag extends a selected distance over the side margin of the rollers which is adjacent the apparatus 10 and such that the long axis of the bag is generally perpendicular to the direction of travel of the rollers. While the arms 20, 22 of press assembly 12 are in an open condition and the nozzle members 112 and 114 are in retracted positions relative to the bag conveyor, as seen in FIG. 2, the conveyor will be actuated by conventional means to move the filled bag B to a position aligned with the nozzle assembly 14, this latter position being shown in FIG. 5. It will be noted that at such time the cylinders 132 and 134 are actuated so that the nozzle members 112 and 114 will be in their innermost positions directly adjacent each other. Then, as shown in FIG. 6, the cylinder 98 of the nozzle assembly is actuated to move the head portions of the nozzle members into the mouth M of the bag, such action occurring (for example) when the bag is sensed (by means not shown) in position to be sealed. FIG. 7 depicts the next step wherein the cylinders 132 and 134 of the nozzle assembly are concurrently activated to force the nozzle members laterally away from each other along the tracks 110. The nozzle positioning cylinders 132 and 134 are de-activated after outer edges 127 of the head portions 122 have engaged the respective side seams S of the bag mouth and have flattened the mouth into a substantially wrinkle-free condition, such de-activation being (for example) triggered after the nozzle members have been moved a predetermined distance apart. FIG. 1 shows, in phantom outlines, the initial retracted positions of the nozzle members, and the extent of penetration of the head portions 122 of the nozzle members into the bag mouth is shown in solid lines in FIG. 1 with the nozzle members being in their laterally separated condition against the side seams of the bag.

The cylinders 132 and 134 are maintained in the nozzle separating mode to hold the bag mouth in a flattened condition through an evacuation step, or a gas-purging step (with a gas supply being substituted for the vacuum source 300, FIG. 7), or a sequence of both evacuation and gas-purging steps (to be described in greater detail hereinafter). After such steps, which can be accomplished in a timed sequence by conventional control circuitry operating the valve 302 following the deactivation of the cylinders 132 and 134, the nozzle members are withdrawn from the bag (by reactivation of cylinder 98) while the nozzle members are maintained in the same laterally spaced positions, thus maintaining tension on the side margins of the bag mouth. During the tensioning of the bag mouth and during the withdrawl of the nozzle members from the bag, the resilient mounting of the nozzle members to the respective saddle blocks 116 and 118 permit the nozzle members to tilt inwardly toward each other, thus providing the pair of nozzle members with a negative draft which permits them to be readily withdrawn while they are tensioning the bag mouth.

Referring next to FIG. 4, it will be seen that the upper and lower die units 24 and 26, respectively, are generally similar to each other although some differences will be noted. The upper die unit 24 includes an upper platen 160 formed from a metal, such as aluminum, while the lower die unit 26 includes a lower platen 162 made from a resilient, heat-conductive elastomeric material, such as Viton polymer, which will substantially deform under the compression forces exerted on it during heat-sealing to thereby apply a uniform pressure and uniform heating over the heat-seal target area of the bag mouth. The upper and lower die units each include three metal plates 164, 166 and 168 which are adjustably secured (by means not shown) in side-by-side relationship to the brace bars 42 (FIG. 3) to form a laminated structure. The central plate 166, as shown in FIG. 4, is wider than the adjacent side plates 164 and 168 and thus projects beyond the sides of the side plates 164 and 168. The rigid upper platen 160 is fastened to the projecting side portion of the central plate 166 of the upper assembly by bolts (not illustrated). The upper platen 160 has a central cavity below the plate 166 into which a cartridge heater 170 is inserted. An insulation bar 172 is also positioned within such cavity above the heater 170, and a strip 174 of insulating material is positioned above the bar 172 in an enlarged portion of the cavity directly below the plate 166. The lower side of the central plate 166 abuts against the upper face of the insulating strip 174, and two insulating strips 176 and 178 are positioned about the elongated faces of the projecting portion of the central plate 166 within the platen cavity adjacent the upwardly projecting side walls of the platen 160 (FIG. 4). Two further insulating bars 180 and 182 are positioned above the upper ends of the platen 160 and the lower sides of the plates 164 and 168. The bottom 161 of the upper platen 160 is shaped to provide three lands and is chamfered at the front and rear surfaces thereof, all as shown in FIG. 4. A thermostat element 184 is fitted within a groove extending longitudinally in the front surface of the platen. A strip of fiberglass-reinforced, Teflon heat-sealing tape 185 is secured over the bottom end 161 of the upper platen 160 by a pair of retainer clamps 186 screwed to the side surfaces of the platen.

The lower die unit 26, FIG. 4, includes a holder member 190 made of aluminum and having a rectangular cavity formed longitudinally in the upper end thereof for receiving the elastomeric lower platen 162. The platen 162 is in the form of a bar having a rectangular cross-section and having a thickness so as to cause the upper portion thereof to project outwardly from the holder 190, as shown in FIG. 4. The elastomeric material of the platen 162 is sufficiently heat-conductive to transfer heat from the die holder member 190 to the thermoplastic bag to be sealed. The holder member 190 generally performs the same heat-transfer functions as the platen 160 of the upper die unit, and it will be noted (FIG. 4) that the cross-sectional shape of the holder member 190 below the platen 162 is substantially similar to that of the rigid upper platen 160. Thus, a cartridge heater 192 is engaged within an upper portion of a cavity 193 extending longitudinally through the holder member 190, and suitable insulating strips, which are identical to the aforementioned insulation elements 172–178, are engaged between the heater 192, the holder member 190 and the projecting side portion of the central plate 166 of the lower die unit. The lower die unit also includes sealing tape 185 held by clamps 186 at the front and rear of the holder member and stretched across the sealing face of the platen 162. Also, a thermostat element 184 is engaged in a groove formed in the side wall of the holder member 190.

It should be noted that with proper consideration of the shape and modulus of elasticity of the elastomeric platen 162, the platen 162 should behave under compression during heat sealing as a "semi-solid liquid" and exhibit uniform normal forces to those confining surfaces in the holder member 190 that restrict the elastomeric member from deforming. This phenomenon is the basis for metal-forming dies which use elastomers such as urethane. It is noted that the amount of bulging at the sides of the elastomeric platen 162 when the platen is under compressive load is a function of the ratio of the amount of unloaded surface area at the edges of the platen to the amount of loaded surface area contiguous with the upper platen 160. Increasing the unloaded surface area that is free to bulge permits greater vertical displacement of the elastomeric platen, or, permits the same vertical displacement with less compressive force. Conversely, decreasing the unloaded surface areas decreases the amount of vertical displacement at a set compressive force, or, for the same vertical displacement, permits a greater force to be applied. Accordingly, the elastomeric lower platen 162 so deforms under the pressure exerted on it by the upper platen 160 that a uniform pressure profile is maintained across the long heat-seal target area of the bag engaged between the two platens to thus assure that heat will be uniformly applied across the heat-seal target area even if the upper platen is warped or slightly misaligned relative to the lower platen. Furthermore, if a small wrinkle or dirt particle should be trapped in the heat-seal target area, the elastomeric lower platen will deform and apply uniform heat and pressure to the heat seal area immediately adjacent the wrinkle or particle. Also, this elastomeric die arrangement eliminates concerns about the uniformity of the force distribution of the hydraulic clamping cylinder 74 to the upper and lower die units 24 and 26.

The resilient strip assemblies 28 and 30 each comprise a long resilient strip 200 made of an easily deformable elastomeric material, and a mounting bracket assembly, the latter assembly consisting of a mounting plate 204 secured by several bolts 206 (FIG. 9) to the side plate 164 of the respective die unit and an elongate clamp 208 which is fastened to the plate 204 to form a channel for retaining the resilient strip 200. The mounting plates 204 are offset from the respective die units by spacers 210 received on the bolts 206, as shown in FIG. 4. The purpose of the strips 200 is to form a seal across the bag inwardly of the die units and before the die units are brought together to assure that the die units will act upon a uniformly flattened portion of the bag mouth. Thus, after the nozzle members 112 and 114 have been inserted into the bag mouth and laterally spread to flatten the mouth, the upper and lower arms of the press assembly 12 are scissored together by actuating the cylinder 74. The cylinder is de-actuated to stop the scissoring action after the sealing strips 200 of the upper and lower strip assemblies 28 and 30 have been compressed together against the mouth of the bag, as shown in FIG. 4, but before the platens 160 and 162 are forced together against the bag. The resilient strips 200 are sufficiently deformable to form an air-tight seal between the panels of the bag and the head portions 122 of the nozzle members 112 and 114 and between the upper and lower bag panels UP, LP that are situated between the separated nozzle members.

With the head portions 122 of the nozzle members 112, 114 inserted into the corners of the mouth M of the bag B and the resilient strips 200 compressing the mouth of the bag, the bag may be evacuated, or purged by injecting a gaseous medium, or both evacuated and purged, as desired, through the passageways 130 formed through the nozzle 112, 114. As seen in FIGS. 1 and 8, a pair of tubes 131a and 131b are coupled to the tubular portions 120 of the nozzle members 112 and 114, respectively. When it is desired to only evacuate the bag, both tubes 131a and 131b are connected, as shown in FIG. 7, to vacuum source 300, with valve 302 being provided to control the application of vacuum to the nozzles. Upon actuation of the valve 302 to permit flow from the nozzle members to the vacuum source, the bag will, of course, collapse. Since the nozzle members are then applying tension against the seams S of the bag to flatten the bag, wrinkles will not propagate into the target seal area of the bag mouth. Also the resilient strips at this point temporarily seal the bag mouth to provide for more efficient evacuation and help in preventing wrinkles from forming in the heat seal target area. Alternatively, the bag may be purged by connecting the tubes 131a, 131b through valve 302 to a source of purging gas, such as nitrogen.

It will be understood that one of the tubes 131a, 131b may be connected to a source of gaseous purging medium (such as nitrogen) and the other to a vacuum source with both connections being independently valve-controlled. With this arrangement, the bag may be first evacuated and then gas-purged to thereby ultimately provide the bag with a purging gas atmosphere. The combination of evacuation and gas-purging enables close control over the amount of negative pressure within the bag to be sealed, which factor is important in the packaging of certain foodstuffs such as bacon and cheese. To achieve a very low oxygen content within the bag, the bag may be first evacuated through one of the nozzle members, then gas-purged with the purging medium supplied through the other nozzle member, and finally evacuated again. Obvious conventional sequential actuation and de-actuation of the valves controlling flow in tubes 131a and 131b can be utilized to provide the foregoing operations. From the foregoing, it will be appreciated that great versatility in food packaging is provided by the apparatus of the present invention.

After the bag has been evacuated and/or gas-purged, the nozzle members 112, 114 are withdrawn by actuation of cylinder 98 while the nozzle members remain in their spread positions. As described hereinbefore, as the head portions 122 of the nozzle members are removed from the bag, the resilient mounting of the nozzle members permits the nozzle members to continuously apply tension to the side seams S of the bag without damage to the seams. Thus, as the nozzle members are withdrawn, the mouth M of the bag is kept under tension by the nozzle member head portions so that the resilient strips 200 seal the bag panels UP, LP together completely across the mouth of the bag and maintain the bag mouth in a flat, wrinkle-free state. The resilient strips keep the heat-seal target area of the bag mouth unwrinkled until the heat seal is subsequently formed.

After the nozzle members 112, 114 are withdrawn, the bag is ready for heat-sealing. The cylinder 74 is again actuated to force the die units 24 and 26 toward each other until, as pointed out hereinbefore, the elastomeric lower platen 162 is sufficiently deformed to apply uniform pressure across the heat-seal target area. After a selected dwell time, a heat seal is formed. The press arms 20, 22 are thereafter opened by actuation of cylinder 74 in the reverse direction, and the conveyor rollers 18 are actuated to remove the evacuated and sealed bag from the apparatus 10 and bring another bag into position for evacuating (and/or gas purging) and sealing.

Although the best mode contemplated for carrying out the present invention has been herein shown and described, it will be apparent that modification and variation may be made without departing from what is regarded to be the subject matter of the invention.

What is claimed is:

1. In combination with a device for forming a seal across the mouth of a flexible bag, an apparatus for flattening the mouth of the bag and for providing fluid communication with the interior of the bag while the bag mouth is in a flattened condition, said apparatus comprising:

a pair of nozzle members, at least one of the nozzle members having a passageway formed therethrough for providing fluid communication with the interior of the bag, and each of said nozzle members including a tubular portion and a flattened head portion extending from said tubular portion;

first moving means resiliently mounted to said nozzle members for moving said nozzle members toward and away from each other in a selected plane, said first moving means including a gasket received on the tubular portions of each of the nozzle members and a pair of adjustable clamp means for engaging each of said gaskets, track means, a pair of block members slidably received on said track means with each of said clamp means being respectively secured to one of said block members, and means for driving said block members toward or away from each other on said track means;

means for supporting a flexible bag having an article therein in an orientation such that the plane in which said nozzle members are movable intersects the mouth of the bag; and second moving means cooperating with said first moving means for inserting said nozzle members into said bag mouth and thereafter withdrawing said nozzle members from said mouth whereby said nozzle members may be first inserted into said bag mouth, then moved to engage opposite edges of the bag mouth and to flatten the bag to permit the bag to be evacuated or gas-purged or both evacuated and gas-purged, and finally withdrawn from the bag mouth, said resilient mounting of said nozzle members to said first moving means permitting said portions of the nozzle members that engage the bag to slide against the edges of the bag while continuing to apply tension to flatten the bag mouth.

2. The apparatus according to claim 1 wherein each of said nozzle members have a passageway formed therein, and means for selectively supplying a gaseous purging medium to one of said passageways.

3. The apparatus according to claim 1 wherein said second moving means includes means operatively connected to said track means for mounting said track means to move along a path which is generally perpendicular to said track means, and means for selectively driving said track means along said last-mentioned perpendicular path.

4. The apparatus according to claim 1 wherein said means for supporting the bag comprises a conveyor extending in a generally horizontal plane wherein a bag with an article therein is horizontally supported on said conveyor with the mouth thereof extending over a side margin of the conveyor and said conveyor is driven to align said bag mouth with said nozzle members.

* * * * *